Sept. 27, 1966 W. C. CRUSE 3,274,680
METHOD OF TYING TOGETHER A PLURALITY OF BODIES
Filed June 14, 1963
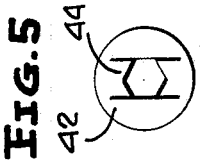
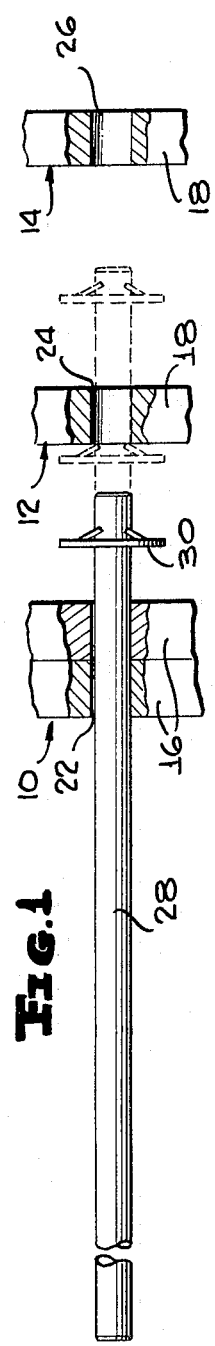
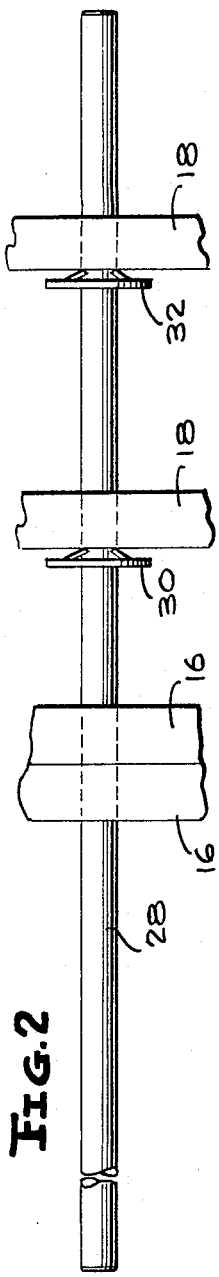
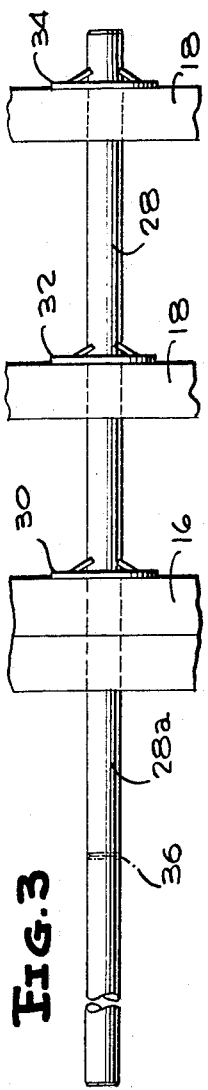
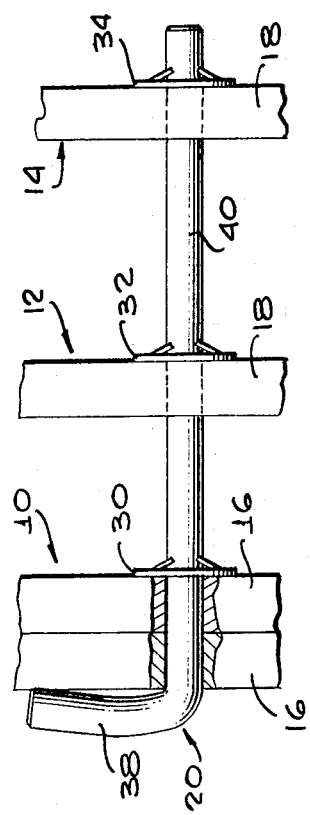
INVENTOR
WILLIAM C. CRUSE
BY *Shoemaker and Mattare*
ATTORNEYS

United States Patent Office 3,274,680
Patented Sept. 27, 1966

3,274,680
METHOD OF TYING TOGETHER A PLURALITY OF BODIES
William C. Cruse, Chippawa Lake, Ohio, assignor to The Akron Products Company, Seville, Ohio, a corporation of Ohio
Filed June 14, 1963, Ser. No. 288,018
3 Claims. (Cl. 29—509)

This invention relates to improvements in a novel method of securing and anchoring devices.

In the fabrication of various types of structures such as buildings, for example, it is frequently desirable to tie together a number of units such as joists, studding, rafters or the like, with such units either positioned side by side so as to make a relatively thick beam or post from a number of thinner units, or by coupling or connecting together a number of such units in spaced relation. Under such conditions the use of conventional threaded bolts may not be feasible or suitable bolts may not be available.

It is accordingly an object of the present invention to provide a new and novel method of using a threadless bolt which may be made available "on the job" in any desired length, limited only by the length of sections or pieces of plain, unthreaded, round wire or rod material and using, with such wire or rod material, conventional self-gripping nuts which may be placed at any desired location on the selected length of rod material and in any number. Another object of the invention is to provide a new and novel method of forming a head on an end of a threadless anchor bolt after a desired length of the bolt, in the form of a length of threadless round wire or rod material of steel or similar suitable metal, has been extended through apertures in two or more structural units to be tied or anchored together.

The invention will be best understood from a consideration of the following detailed description taken in connection with the accompanying drawing forming a part of the specification and wherein:

FIG. 1 illustrates the beginning of one stage in the use of the bolt of the present invention for coupling or tying together two or more structural units such as studding, rafters or the like, wherein a spring self-gripping nut has been placed on the advancing end of the bolt rod between two units, and showing in dotted outline how the first applied nut is held in place by one of the units while the rod is extended on through to receive a second nut.

FIG. 2 illustrates in full lines the bolt rod extended through three units with the nuts thereon ready to be drawn back into final position.

FIG. 3 illustrates the bolt rod and nuts in final position before severing the rod and forming the head.

FIG. 4 is a view illustrating the final, formed bolt.

FIG. 5 is a view in elevation of the spring self-gripping nut looking at the side or face from which the flexible tongues project.

Referring now more particularly to the drawing, there are shown in each of the four figures, for purposes of illustrating the formation and method of using the threadless anchor bolt, a series or group of structural units, which units are designated 10, 12 and 14. These structural units are not intended to represent any specific elements of a building or other structure. They may represent, for example, studding, floor joists, roof rafters, or other parts of a building or parts of some structure other than a building, and they may be of wood or metal. They merely represent units or elements of some type of construction, where such units are intended to be secured or tied together either in spaced relation or in abutting relation.

Considering, for example, that the three generally designated units are wood timbers, it will be seen that the first unit 10 comprises two such timbers, designated 16, placed together or one against the other, while the other timbers are single and each of the other single timbers is designated 18 and are spaced apart one from the other and from the double timber unit 10.

The threadless bolt of the present invention is illustrated in completed form with nuts applied thereon, in FIG. 4, showing the bolt tying or coupling together the three units 10, 12 and 14, and the bolt as a whole is designated 20.

The completed or finished bolt is formed from a rod of the desired metal, preferably steel, and the rod may be cut in the desired length, initially to connect together two or more bodies such as the pair of timbers 16, or the group of timber units, or a workman may start with a rod of indeterminate length and run it through apertures formed in alignment through the timbers of the different units, placing the spring self-gripping nuts thereon as the rod progresses through the timbers, and then cutting off the excess length of material after all of the units have been coupled together, leaving enough length projecting from the outside unit for the formation of the bolt head. As an illustration of one method of forming the threadless bolt and effecting the tying together of a number of units such as those shown, it will be seen that the timbers of the three units 10, 12 and 14 have been provided with the aligned holes or apertures 22, 24, and 26 respectively. A tie rod 28 is then extended at one end through the aligned apertures in the timbers 16 of the first unit 10. When the end of the rod enters the space between the unit 10 and the unit 12, a spring self-gripping nut may be slipped on the end of the rod. The rod is then extended further into and through the aperture 24 of the next unit timber and when the free end appears in the space between the timbers of the units 12 and 14, a second self-gripping nut will be slipped thereon. The second nut is shown in full lines in FIG. 2 and designated 32. The nuts 30 and 32 will be carried forward until they contact the timbers 18 of the two units 12 and 14, whereupon the movement of the rod can be continued until the free end of the rod appears beyond the innermost timber. The rod then may be drawn back until the nut 30, first applied, contacts the unit 10, whereupon further retraction of the rod will not be permitted, but by spacing the units 14 and 12 further apart than the units 10 and 12, the second nut 32 will not contact the unit 12 but may be drawn into place manually and the portion of the rod which remains projecting beyond the innermost unit 14 may then have the nut slipped thereon as indicated at 34. However, instead of moving the rod to an extent where it may be necessary to pull it back so as not to leave too much of the rod wasted beyond the innermost unit, the advancing end of the rod can be stopped immediately after a sufficient amount of it appears beyond the innermost unit 14 to receive a nut, such as the nut 34, after which the first and second applied nuts 30 and 32 can be manually slipped in the reverse direction until they contact the units 10 and 12 respectively so that the position of the bolt rod 28 and nuts will then be as illustrated in FIG. 3.

After the condition of the bolt rod 28 and nuts is developed to the point illustrated in FIG. 3, and considering that an indefinite length of the bolt rod was started with, the rod is severed at a location adjacent to the other side of the outermost unit 10, as, for example, at the marking or severance line designated 36, leaving the portion 28a with which to form or fashion the bolt head.

The portion 28a of the bolt rod is then bent back against the outer side of the unit 10 and in this operation the nuts will be drawn firmly against the units adjacent thereto, the bent portion forming the bolt head which is designated in the finished bolt 20, in FIG. 4, by the reference character 38, the reference character 40 here designating the bolt shank.

The construction of a spring self-gripping nut is, of course, well known to those versed in the art, but an illustration of the same is given nevertheless in FIG. 5 where the body portion of the nut, which is in the form of a relatively thin disk of resilient metal, is designated 42 while the two end slotted resilient tongues are designated 44. When the nut is slipped onto a rod, in the manner here illustrated, the rod, which must be of a slightly greater diameter than the spacing between the notched ends of the tongues 44, will spring the tongues apart and consequently upon an attempt to reversely slide the nut on the rod the edges of the tongues will bite into the material and prevent such reverse movement.

While the invention has been illustrated and described in connection with a group of apertured timbers, two of which are shown in side-by-side contacting relation to form one structural unit, while others have been shown singly in spaced relation, it is to be understood that the threadless tie bolt of the present invention formed in the manner described, may be used to tie together two or more or any number of timbers in side contacting relation to form a massive beam unit. In such case it will be obvious that only a single spring self-gripping nut would be employed, being applied to the end of the bolt which projects through the group of timbers while the opposite end of the bolt would be bent or turned into locking position to form the head.

On the other hand a series of bolts of predetermined length could be made up with an end portion of the rod sections preliminarily turned or bent to form the head 38 so that when the body portion of the bolt or the shank portion 40 is extended through an apertured body or a number of apertured bodies, the head would be ready formed to be forced against the outer side of the body while the spring self-gripping nut is slipped onto the opposite end of the bolt shank and into position against the inner side of the apertured body through which the bolt passes.

From the foregoing it will be seen that there is provided by the present invention a new and novel threadless tie bolt structure and method of making the same, and which tie bolt may by fashioned with the bent head formed, before putting the bolt into service and applying a nut, or such bolt may be fashioned from a length of rod material as a final step of coupling a number of apertured members together, by forming the bolt head at the desired stage of operation after any desired or necessary length of the bolt rod material has been utilized.

By the present invention much time and expense can be saved to builders and construction workers over the use of conventional threaded bolts having conventional preformed polygonal shaped heads, since a builder only needs to have a supply of plain metal rods and spring self-gripping nuts, by means of which he can form the bolts as needed in any desired length and bend the outer end of the rod material in clinching engagement with the beam or other unit through which the rod is passed, after cutting off the bolt forming portion of the rod from the remaining portion.

As this invention may be embodied in several forms without departing from the spirit or essential characteristics thereof, the present embodiment is therefore illustrative and not restrictive, since the scope of the invention as defined by the appended claims rather than by the description preceding them, and all changes that fall within the metes and bounds of the claims or that form their functional as well as conjointly cooperative equivalents, are therefore intended to be embraced by those claims.

I claim:

1. The method of anchoring or tying together at least two bodies having openings therethrough and in alignment with one another, which method consists in extending an end of a tie rod through the openings to a position where one end of the rod extends beyond one body, then slipping a self-gripping nut on the extended end of the rod and effecting movement of the nut to a position in which it bears against said one body, and then bending the other end of the rod into clinching engagement with the other body.

2. The method of anchoring or tying together a plurality of bodies having openings therethrough and having said openings in alignment one with the other, which method consists in extending an end of a length of round tie rod material into and through said aligned openings to a position where said one end projects beyond the side of one body which is remote from the other bodies, then slipping a self-gripping nut on the projecting end of the rod and effecting movement of the rod to a position where it bears against the said side of said one body, then severing the rod at a point removed a substantial distance from that side of the outermost one of the other bodies which is remote from the other bodies to leave a length of the rod extending beyond the adjacent body, and then bending the said length of rod which is left extending beyond the said other one of the bodies, into a position of clinching engagement with the adjacent body.

3. The method of tying together a plurality of bodies disposed in spaced parallel relation and having transverse openings therethrough with said openings in alignment, which method consists in extending an end of an indefinite length of round tie material through the aperture of a first one of the bodies until said end is positioned between the first one of the bodies and a second one thereof, then slipping a self-gripping nut on the end of the rod between the first and second bodies, and then continuing to extend the end of the rod through the opening in the second one of the bodies until it is exposed in a space between the second and a third one of the bodies, then slipping onto the end of the rod between the second and third one of the bodies, a self-gripping nut, then continuing to extend the rod through the aperture of the third one of the bodies until the end is exposed, then slipping a self-gripping nut on the exposed end of the rod, then effecting movement of all of the said self-gripping nuts in the reverse direction to that in which the rod was moved until each nut comes into a position of engagement against a side of an adjacent body, then severing the rod at a point located outwardly from the outer side of the first one of the bodies to form a short projecting terminal portion, and finally, bending said projecting terminal portion into clinching engagement with the adjacent side of the first one of the bodies to draw and hold all of the self-gripping nuts tightly against the said sides of the said adjacent bodies.

References Cited by the Examiner

UNITED STATES PATENTS

| 867,943 | 10/1907 | Boles. | |
| 2,095,714 | 10/1937 | Pinaud et al. | 249—216 X |
| 2,229,708 | 1/1941 | Tinnerman | 83—36 X |
| 2,293,743 | 8/1942 | Miles et al. | 52—741 |
| 2,378,850 | 6/1945 | Hyre. | |

FOREIGN PATENTS

| 803,565 | 4/1951 | Germany. |

CHARLIE T. MOON, *Primary Examiner.*